United States Patent Office 3,546,113
Patented Dec. 8, 1970

3,546,113
METHOD FOR PURIFYING FRESH AND WASTE WATERS BY FLOCCULATION IN AN AMPHOTERIC PHASE
René-Rodolphe Seiler, Lausanne, Switzerland, assignor to Wilhelm Squindo, Lausanne, Switzerland
No Drawing. Filed June 25, 1968, Ser. No. 739,663
Claims priority, application Switzerland, June 27, 1967, 8,907/67; Dec. 8, 1967, 17,121/67
Int. Cl. B01d 21/01
U.S. Cl. 210—52
11 Claims

ABSTRACT OF THE DISCLOSURE

A method for the purification of waste waters by flocculation in an amphoteric medium with the use of a water-soluble zinc salt, e.g. zinc chloride, in an environment whose pH is adjusted within the range 7.8–8.5 by employing a buffering solution of alkali metal salts of boric acid. Sodium tetraborate and sodium metaborate are preferred. The preliminary pH adjustment can be made with a strong alkali: this is the case with slightly acidic waters.

---

The treatment of water for the removal of organic substances in suspension and in solution has been heretofore practiced, in nearly exclusive manner, with filtering beds which mainly consisted of quartziferous sands. When said beds are unable to attain the retention degree which makes purification satisfactory, flocculation techniques are preferred, which are performed with the agency of iron and aluminum salts and a large use of hydrated lime.

A chemical and physico-chemical survey of the organic pollutants of fresh and waste domestic water leads to the conclusion that the prevailing fraction of the polluting organic substances are substances which have either an acidic or a weakly basic nature and, in the majority of instances, exhibit an amphoteric behavior.

The use of flocculating agents having a strongly acidic or basic character does not seem to be particularly suited to the conditions of insolubilization of organic substances having an amphoteric nature.

A phase-equilibrium break by aluminum salts, as are commonly used for treating fresh water, is complete enough for obtaining water whose residual propensity to oxidation by potassium permanganate is regarded as being sufficient.

In contrast, in the case of waste domestic water, the residual oxidability as ascertained after a treatment with aluminum salts is yet too high, so that said flocculating agent should be employed in such large amounts as to render the treatment economically unacceptable. Thus, waste household water is always purified by biological methods. In addition, aluminum sulphate produces flakes which settle with difficulty and cannot be easily dehydrated, in addition to the circumstance that settling takes considerable time.

Flocculation methods have also been tried, which are based on the use of starchlike substances, variously modified and combined with other components, such as flocculating agents, but no positive results have been obtained.

Another flocculating agent which is particularly used for stripping water from phosphates which are present in the form of orthophosphates and polyphosphates, is trivalent iron, generally as ferric chloride. Better results are obtained with said agent as compared with aluminum sulphate, but other drawbacks are experienced, such as the discoloration of the purified water which prevents its use as potable water due to the formation of extremely bulky muds.

The use of zinc salts, more particularly zinc chloride, has also been attempted. In this latter connection, U.S. Pat. No. 1,966,733 discloses a method for purifying water, wherein the water to be purified is supplemented by a water-soluble cadmium zinc and manganese compound, such as a chloride, a nitrate or a sulphate, with the indicated purpose of reducing the hardness due to the presence of water-dissolved silica, which is precipitated in the form of an insoluble silicate. As by so doing a free acid is formed, the latter is then neutralized with an appropriate alkali.

Also U.S. Pat. No. 2,074,082 discloses the use of inorganic zinc salts for flocculating substances contained in suspension in sewage water which had previously undergone a biological purification process.

In this connection, it should be added that in this method it is specifically prescribed that zinc chloride should be used at a pH between 5 and 7, the preferred value being 6.2.

Finally, in U.S. Pats. Nos. 2,511,299 and 2,300,693 the use of zinc chloride is cited for the purification of waters and of sewage liquors, respectively.

However, in the method adopted heretofore, zinc salts, and more particularly zinc chloride did not meet with any success and have been, conversely, replaced by aluminum- and iron-based coagulating and flocculating agents.

It has now been surprisingly ascertained, and this is the basic idea of the present invention, that far more satisfactory results are obtained if flocculation is caused to occur by addition of a water-soluble zinc salt to water, either fresh or waste water, which has been previously conditioned at a pH of 7.8–8.5 by an alkali metal salt of boric acid.

The flocculation in amphoteric phase according to the invention is carried out by adding to the water to be treated an amount, which varies consistently with the impurity load of the water, of a water soluble zinc salt and by adjusting the pH to a preferred range of 7.8–8.2, that which can be obtained by adding an appropriate amount of an alkali metal salt of boric acid. In the case of water having a pH of less than 7.4, the alkali metal salts of boric acid could serve to adjust the pH to a value of 7.8–8.5 but there is the risk of introducing an exceedingly high amount. In this case the pH is adjusted with a strong alkali, and the boric acid salts are used for adjusting within at least 0.4 units in the pH range. The medium is thus influenced by the amphoteric character of boric acid and its salts within the pH field in which flocculation is caused to take place. The inventive method permits purification of household waste water immediately after screening thereof. In this case a very intense phosphate removal is simultaneously obtained, irrespective of the fact that orthophosphates or polyphosphates are involved. Household waste waters treated according to the present invention have a residual DBO5 value which is lower than that specified by regulations for their dumping. The interest of the method also lies in the fact that the mud formed by the flakes formed by zinc under the conditions described above settles in less than 15 minutes and, upon separation of the treated liquid, can easily be centrifuged and then directly incinerated.

Once the muds have been settled, the water is filtered and treated through a fixed bed of activated charcoal, more particularly of the kind disclosed and claimed in a copending patent application by the same applicant and filed concurrently herewith. The essential function of said charcoal is to capture the detergents which escape any flocculation process whatsoever. The result of said filtration is a perfectly clear, colorless and odorless filtrate. The filtrate does not generate any persistent foam upon shaking and this is the result of the action of the special-type charcoal mentioned above on the detergents. The inventive method has been likewise applied to dephosphatization of the effluents of the biological purifying stations for waste household waters. The use of zinc in an amphoteric medium has proved to be an improvement over the effect generated by trivalent iron, which is the most widely recommended flocculating agent for phosphates. While iron is used in amounts which strongly exceed the amount of orthophosphates to be removed, the use of zinc under the conditions of the present invention achieves the precipitation of its stoichiometrical value of phosphoric acid and even more, since polyphosphates also have been precipitated. The method has been likewise applied to the flocculation of active muds as produced by the secondary settling tanks of biological purification installations. Muds of this kind, which contain from 0.5 to 1% of solids, have been flocculated by zinc chloride under the application conditions of this invention. In 20 minutes, the settling of these muds has been completed: upon decantation of the supernatant clear liquid, the solids contents of said muds is about 4%. Upon centrifuging, the product thus obtained has a solid contents which exceeds 14% and can reach 20%. Flocculation in an amphoteric medium is a preliminary operation in the case of purification of many industrial waste waters, such as those coming from the manufacture of protein-based glues or from industries which utilize said kind of glues; mainly the factories of fiberboards which work with wet or semi-wet methods. Waters of this kind settle only in an incomplete manner and have a very high $DBO_5$ rating, that which requires a long-lasting and expensive biological purification. Iron and aluminum salts are incapable of bringing about the expected flocculation on account of the colloidal substances which are present. The inventive method permits to obtain an abundant flocculation and water can be dumped at a $DBO_5$ value below 20 milligrams of oxygen per liter, a value which is amply encompassed within the limits posed by the specification issued in several countries for preventing water pollution. In the case of waste water from fiberboard factories, the flocculation according to this invention must be completed by a second flocculation with ferric chloride which is then capable of precipitating the monoses and polyoses which have not been entrained by the zinc-generated flakes.

EXAMPLE 1

10 liters of lake water taken from a bank which was strongly polluted by muds were supplemented with 0.4 mls. of a 32° Beaumé zinc chloride solution. Then, 0.3 mls. of a solution containing one mole of sodium metaborate per liter was added, along with an equal weight of sodium tetraborate. The pH was adjusted to 8.2 by addition of 2-normal caustic soda. Flakes were quickly formed, which settled in about 20 mins. The treated water is subsequently filtered on activated charcoal and exhibits upon filtration a residual oxidability of 2.5 mgms. oxygen per liter.

EXAMPLE 2

250 liters of effluent from a biological purification station of waste household water are pre-filtered on activated charcoal and 5.5 grms. zinz chloride are added thereto. 10 mls. of a solution containing one mole of sodium metaborate per liter, and an equivalent amount by weight of sodium tetraborate are then added. The pH is adjusted with caustic soda (2 N) to 8.2. A mass of very thin flakes is formed, which are caused to pass through a filtering bed of very porous activated charcoal. The perfectly clear liquor, which does not form any foam, contains less than 1 gram of orthophosphates per cubic meter and its oxidability is 2.5 to 3 milligrams of oxygen per liter.

EXAMPLE 3

One liter of mud from the secondary settling tank of a biological purification station of household waste waters is supplemented with 0.175 mls. of a 32° Bé. zinc chloride solution. One ml. of a molar solution of sodium metaborate is then added and pH is adjusted to 7.8–8.2 by adding 2 N caustic soda. Coagulation and flocculation of the mud occurs rapidly, followed by settling, and the overlying water is clear and devoid of any orthophosphate. The mud subjected to centrifuging is considerably enriched with solids, the average contents of these latter being 18%.

EXAMPLE 4

Ten liters of household waste water collected immediately upon screening are supplemented by 1.3 mls. of a molar solution of sodium metaborate. Subsequently, 1.75 mls. of 32° Bé. zinc chloride solution are added. The pH is then adjusted to 8.2 by 5 to 5.5 mls. of 2 N caustic soda. Abundant flakes are formed forthwith and these settle within 15 minutes. The settled flakes, subjected to centrifuging and heated in a china clay capsule are very rapidly burnt out without odor and leaving a carbonaceous residue from which zinc can be recycled.

EXAMPLE 5

Ten liters of waste water from a fiberboard factory working with the wet process, are supplemented by 4.8 mls. of a 32° Bé. zinc chloride solution. Five mls. of a molar solution of sodium metaborate are then added, along with 20 mls. of 2 N caustic soda to adjust the pH to 8.2–8.4. Abundant flakes are formed and the water is clear since any colloid phase has been broken out. The rapid settling of these flakes permits to collect muds which have been subsequently centrifuged. The mud, subjected to heat, is decomposed at a temperature in the neighborhood of 300° C. and a carbonaceous residue is left, from which zinc can be recovered. The solution lying above the settled muds is treated with 2 mls. of a solution of ferric chloride having a concentration of about 44% $FeCl_3$. On completion of this addition, flakes are formed which, by settling, form iron mud: these have entrained the monoses and polyoses which escaped the action of zinc. The thusly purified water has, when it is dumped, a residual $DBO_5$ of less than 10 milligrams oxygen per liter, for an initial $DBO_5$ value of 4800 mgms. oxygen per liter.

In order that the advantages of the present invention may become fully conspicuous, the results are now reported of tests performed by applying the inventive method in union with the use of filtering beds based on activated charcoal of the kind disclosed and claimed in a concurrently filed copending patent application by the same applicant.

The admixture of the reagent with the liquor to be treated was carried out in a 200-liter cylindrical vessel, with the agency of a rotary stirrer. The pH was adjusted to the desired value and checked with a glass-electrode pH-meter, then stirring was discontinued and the liquor was allowed to settle for one hour. The clarified liquid was then siphoned out and filtered on a layer of charcoal contained in a glass column. The carbon column has a height of 100 cms. and a diameter of 3 cms., that which corresponds to a volume of about 700 cu. cms. and to a weight of about 140 grs. (apparent specific gravity 0.2). The filtration velocity varied from 6 to 12 meters an hour. Counterflow washings of the filter were carried out from time to time at a speed of 12 to 18 meters an hour, by using the 4–5% of the previously purified water. The reactant solutions are indicated with the letters A (buffer), B (flocculating agent), C (alkalizer). Prior to any test, assays were made on 2-liter samples to establish the most appropriate dosages.

The muds were collected and examined. In addition, samples of the raw liquor, the clarified water and the effluent from the charcoal filter were examined after that predetermined volumes of water had flowed.

(A) Tests on the water of the Olona river 25 liters of liquor have been used with the following dosages for the reactants: A–7 mls.; B–9 mls.; C–25 mls. The liquor was energetically stirred for 3 mins. then gently stirred for 7 mins. and finally allowed to settle for one hour. The pH after the treatment was 8.2.

Settling was completed within 15 minutes and, after one hour the clear liquor was siphoned out and filtered through activated charcoal at a velocity of 11 meters an hour. The muds were 4% by volume with respect to the treated water, but, upon centrifuging (5 mins. at 2,500 r.p.m.), they were reduced to 0.4%.

The results of the analyses are reported in Table 1, where columns 3 and 4 give the results of the analyses after filtration of 2 and 20 liters, respectively.

(B) Tests on sewage liquors 200 liters of liquor were employed with the following dosages for the reactants: A–26 mls.; B–35 mls.; C–60 mls. Upon energetic stirring for 3 mins. and gentler stirring for 7 mins., the liquid was allowed to stand for one hour. The pH was 8.2. After one hour the clarified liquor was siphoned out and filtered through activated charcoal at a velocity of 10 meters an hour. The results of the analyses are reported on Table 2.

(C) The test was repeated on the liquors twice exactly as for the first test, but with the following reactant dosages: A–52 mls.; B–70 mls.; C–125 mls. The pH was 8.40. The muds formed 2% of the volume of the treated water, but by centrifuging (5 mins. at 2,500 r.p.m.) they were reduced to 0.4%. The muds could also be easily filtered and, by calcinating in a china capsule 22 grs. of muds which had been collected on a filter and allowed to dry in air on the filter, 2 grs. of a greyish residue were obtained, predominantly formed by zinc oxide. The results of the analyses are reported on Tables 3 and 4, the filtration having been carried out at a velocity of 10 and 6 meters an hour, respectively.

TABLE 1.—TEST ON WATER OF THE OLONA RIVER

| Characteristics of the water | As-taken sample, Olona | Clarified after flocculation | Upon filtration of— | |
|---|---|---|---|---|
| | | | 2 liters | 20 liters |
| Color | Yellow, cloudy | Yellowish, cloudy | Colorless, clear | Colorless, clear. |
| Odor | Disgusting | Slightly unpleasant | Odorless | Odorless. |
| pH | 7.5 | 8.2 | 7.9 | 7.9. |
| Solids, in suspension, p.p.m | 117 | 37 | | |
| A.O. 4 hours, p.p.m | 52 | 7 | 1 | 2. |
| Total phosphorous, p.p.m. $PO_4$ | 5.2 | 0.21 | 0.08 | 0.06. |
| Polyphosphates, p.p.m. $PO_4$ | 3.8 | 0.16 | 0.06 | 0.05. |
| Foam | High, persistent | Somewhat persistent | Nil | Nil. |

Note.—A.O. 4 hrs: residual oxidability by permanganate after 4 hours.

TABLE 2.—TEST ON SEWAGE WATER

| Characteristics of the liquor | As-taken sample | Clarified after flocculation | After filtration of 20 liters |
|---|---|---|---|
| Color | Cloudy, yellow | Cloudy, yellowish | Colorless, slightly hazy. |
| Odor | Disgusting | Disgusting | Odorless. |
| pH | 8.1 | 8.2 | 8.1. |
| Suspended solids, p.p.m | 230 | 52 | |
| A.O. 4 hours, p.p.m | 82 | 32 | 12. |
| Total phosphorous, p.p.m. $PO_4$ | 7.8 | 3.8 | 1.2. |
| Polyphosphates, p.p.m. $PO_4$ | 4.7 | 3.1 | 1. |
| Foam | High, persistent | Somewhat persistent | Short lasting. |

TABLE 3.—TEST ON SEWAGE WATER

| Characteristics of the liquor | As-taken sample | Clarified after flocculation | Upon filtration of— | | Upon washing | Upon filtration of 60 liters |
|---|---|---|---|---|---|---|
| | | | 20 liters | 40 liters | | |
| Color | Cloudy, yellow | Cloudy, yellowish | Colorless, min. cloudy. | Colorless, sl. cloudy. | Colorless, min. turb. | Colorless, min. turb. |
| Odor | Disgusting | Slightly unpleasant | Odorless | Almost odorless. | Odorless | Odorless. |
| pH | 8.1 | 8.4 | 8.3 | 8.4 | 8.3 | 8.3. |
| Solids, in susp., p.p.m | 272 | 28 | | | | |
| A.O. 4 hours, p.p.m | 98 | 9 | 2.6 | 3.7 | 2.1 | 1.6. |
| Total phosphorous, p.p.m. $PO_4$ | 9.2 | 0.3 | 0.12 | 0.16 | 0.13 | 0.13. |
| Polyphospates, p.p.m. $PO_4$ | 5.4 | 0.21 | 0.11 | 0.14 | 0.13 | 0.12. |
| Foam | High, persistent | Somewhat persistent | Nil | Short lasting | Almost nil | Almost nil. |
| A.B.S., p.p.m | 3 | 3.7 | 0.4 | 1.1 | 0.62 | 0.4. |
| Ammon. nitrogen, p.p.m. N | 32.6 | 3.2 | 0.1 | 0.17 | 0.08 | 0.11. |

Note.—A.B.S.: synthetic detergents.

TABLE 4.—TEST WITH SEWAGE WATER

| Characteristics of liquor | Clarified after flocculation | Upon filtration of— | |
|---|---|---|---|
| | | 20 liters | 40 liters |
| Color | Cloudy, yellowish | Colorless, almost clear | Colorless, almost clear. |
| Odor | Slight | Odorless | Odorless. |
| pH | 8.4 | 8.3 | 8.3. |
| Solids in suspension, p.p.m | 32 | | |
| A.O. 4 hrs., p.p.m | 9 | 1.6 | 1.4. |
| Total phosphates, p.p.m. $PO_4$ | 0.47 | 0.13 | 0.07. |
| Polyphosphates, p.p.m. $PO_4$ | 0.31 | 0.11 | 0.07. |
| Foam | Persistent | Almost nil | Nil. |
| A.B.S., p.p.m | 3.9 | 0.4 | 0.1. |
| Ammon. nitrogen, p.p.m. N | 2.8 | 0.12 | 0.06. |

Note.—For as-taken sample see preceding tables.

Tables 5 and 6 illustrate the percentage reduction of pollution by flocculation and by flocculation followed by filtration on activated charcoal. These data are very significant as themselves and confirm that the flocculating reactant in a buffered solution is positively better than aluminum sulphate and ferric chloride, both as to the required dosage and as to the obtainable degree of purification and also as to the possibility of thoroughly purifying the muds from which the reactant can be readily recovered.

TABLE 5.—PERCENTAGE REDUCTION OF POLLUTION BY FLOCCULATION

| Characteristics | Olona | Liquor, Table 2 | Liquor, Table 3 |
| --- | --- | --- | --- |
| Solids in suspension | 68 | 77 | 90 |
| A.O. | 86 | 61 | 91 |
| Total phosphorous | 96 | 51 | 97 |
| A.B.S. | | | ? |
| Ammonic nitrogen | | | 91 |

TABLE 6.—PERCENTAGE REDUCTION OF POLLUTION BY FLOCCULATION AND FILTRATION ON ACTIVATED CHARCOAL

| Characteristics | Olona | Liquor, Table 2 | Liquor, Table 3 |
| --- | --- | --- | --- |
| Solids in suspension | 100 | 100 | 100 |
| A.O. | 95 | 85 | 98 |
| Total phosphorous | 99 | 85 | 98 |
| A.B.S. | | | 80–87 |
| Ammonic nitrogen | | | 99 |

In order that the particular value of the inventive method for dephosphatization of water may be further pointed out, the following Table 7 reports the results of tests conducted on sewage waters of the purifying station of Lausanne, as treated with the flocculating reactant under the conditions described in the foregoing.

and the remaining correction is effected by the alkali metal salt of boric acid.

4. A method according to claim 1 wherein the alkali metal salt of boric acid is sodium tetraborate, sodium metaborate or mixtures thereof.

5. A method according to claim 1 wherein the water-soluble salt of zinc is zinc chloride.

6. A method according to claim 1 wherein the water is fresh water containing organic substances in suspension and in solution, and the alkali metal salt of boric acid is sodium tetraborate, sodium metaborate or admixtures thereof.

7. A method according to claim 1 wherein the water is an effluent of a biological purification of wase household water for removal therefrom of orthophosphates which are present therein in suspension and in solution, the water-soluble zinc salt being present in such amount that the zinc is at least equal to the stoichiometrical amount which is necessary for the flocculation of said orthophosphates, and said alkali metal salt of boric acid is sodium tetraborate, sodium metaborate or mixtures thereof.

8. A method according to claim 7 comprising filtering the water during said flocculation step, through a layer of activated carbon.

9. A method according to claim 1 wherein the water is domestic waste water.

10. A method according to claim 1 wherein the water is active mud of secondary settling tanks of biological purification plants.

11. A method according to claim 1 wherein the water is industrial waste water.

TABLE 7.—DEPHOSPHATIZATION TESTS ON WATER TAKEN AT THE WATER PURIFYING STATIONS OF LAUSANNE

| Days | | | Mg./liter | | | | |
| --- | --- | --- | --- | --- | --- | --- | --- |
| | | | Ortho-phosphates | Poly-phosphates | Total | Dry substances | $DBO_5$, mg. $O_2$/l. |
| I | Hours 11, 15 | 1 | 4.0 | 2.0 | 6.0 | 5.2 | |
| | | 2 | | | | | |
| | | 3 | 0.4 | 2.6 | 3.0 | | |
| | Hours 15, 00 | 1 | 16.0 | 4.0 | 20.0 | 7.5 | |
| | | 2 | 7.5 | 2.5 | 10.0 | 0.4 | |
| | | 3 | 0.5 | 1.5 | 2.0 | 0.0 | |
| II | Hours 14, 15 | 1 | 5.0 | 5.0 | 10.0 | 7.0 | |
| | | 2 | 5.0 | 2.5 | 7.5 | 0.5 | |
| | | 3 | 0.5 | 0.3 | 0.8 | 0.1 | |
| | Hours 16, 30 | 1 | 7.5 | 0.0 | 7.5 | 6.0 | |
| | | 2 | 7.5 | | | 0.4 | |
| | | 3 | 0.4 | 0.6 | 1.0 | 0.0 | |
| III | Hours 13, 50 | 1 | 7.5 | 2.5 | 10.0 | 5.0 | |
| | | 2 | 5.0 | 2.5 | 7.5 | 0.4 | |
| | | 3 | 0.7 | 2.2 | 2.9 | 0.0 | |
| IV | Hours 14, 00 | 1 | 6.0 | 6.0 | 12.0 | 5.0 | 11.5 |
| | | 2 | 6.0 | 2.0 | 8.0 | 0.2 | |
| | | 3 | 0.7 | 1.8 | 2.5 | 0.0 | 1.5 |
| | Hours 16, 45 | 1 | 5.0 | 5.0 | 10.0 | 4.3 | 14.5 |
| | | 2 | 5.0 | 3.0 | 8.0 | 0.3 | 4.5 |
| | | 3 | 0.7 | 2.0 | 2.7 | 0.0 | 1.3 |
| V | Hours 14, 20 | 1 | 10.0 | 4.5 | 14.5 | 4.1 | 10.2 |
| | | 2 | 7.5 | 3.0 | 10.5 | 0.2 | |
| | | 3 | 0.6 | 2.2 | 2.8 | 0.0 | 1.5 |
| | Hours 16, 00 | 1 | 5.0 | 2.0 | 7.0 | 4.1 | 10.6 |
| | | 2 | 5.0 | 1.0 | 6.0 | 0.3 | |
| | | 3 | 0.3 | 0.7 | 1.0 | 0.0 | 1.4 |

NOTE.—(1) Water coming from the settling tank; (2) water after filtration on said active charcoal; (3) water final, after fluocculation and filtration an said active charcoal.

The embodiments of the invention in which an exclusive property or privilege is claimed are defined as follows:

1. A method for the purification of water by flocculation, comprising adding to the water a water-soluble zinc salt and an alkali metal salt of boric acid, and adjusting the pH of the water to a value between 7.8 and 8.5.

2. A method according to claim 1 wherein the addition of said alkali metal salt causes the pH to vary by 0.4 units.

3. A method according to claim 1 wherein the pH is adjusted to a value of 7.4–7.8 by caustic soda or potash,

References Cited
UNITED STATES PATENTS

| 1,966,733 | 7/1934 | Reimers | 210—52 |
| 2,074,082 | 3/1937 | Domogalla | 210—53 |
| 2,300,693 | 11/1942 | Oswald | 210—42 |
| 2,511,299 | 6/1950 | Seifriz et al. | 210—43 |
| 2,653,900 | 9/1963 | Holland | 210—53X |
| 3,067,133 | 12/1962 | Conley et al. | 210—42 |
| 3,163,598 | 12/1964 | Yoshihara et al. | 210—52X |

J. L. DECESARE, Primary Examiner